United States Patent
Dou et al.

(10) Patent No.: US 9,300,401 B2
(45) Date of Patent: Mar. 29, 2016

(54) UPDATING APPARATUS AND METHOD FOR EQUALIZER COEFFICIENT, RECEIVER AND OTPICAL COMMUNICATION SYSTEM

(71) Applicant: Fujitsu Limited, Kawasaki (JP)

(72) Inventors: Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 62 days.

(21) Appl. No.: 14/026,573

(22) Filed: Sep. 13, 2013

(65) Prior Publication Data

US 2014/0079407 A1   Mar. 20, 2014

(30) Foreign Application Priority Data

Sep. 14, 2012   (CN) .......................... 2012 1 0342454

(51) Int. Cl.
  H04B 10/00   (2013.01)
  H04B 10/2507   (2013.01)
  H04L 25/03   (2006.01)
  H04B 10/61   (2013.01)

(52) U.S. Cl.
  CPC ........ *H04B 10/25073* (2013.01); *H04B 10/616* (2013.01); *H04B 10/6162* (2013.01); *H04L 25/0305* (2013.01); *H04L 25/03006* (2013.01); *H04L 2025/0377* (2013.01); *H04L 2025/03426* (2013.01)

(58) Field of Classification Search
  USPC .................................................. 398/202–214
  See application file for complete search history.

(56) References Cited

U.S. PATENT DOCUMENTS

| | | | |
|---|---|---|---|
| 7,526,019 B1 | 4/2009 | Radionov et al. | |
| 2007/0047637 A1 | 3/2007 | Lee | |
| 2007/0237250 A1 | 10/2007 | Zhang | |
| 2010/0014873 A1* | 1/2010 | Bulow | 398/159 |
| 2011/0002689 A1* | 1/2011 | Sano et al. | 398/44 |
| 2011/0052215 A1 | 3/2011 | Zhou | |
| 2011/0268459 A1* | 11/2011 | Rollins et al. | 398/208 |
| 2012/0134684 A1* | 5/2012 | Koizumi et al. | 398/202 |
| 2012/0148265 A1* | 6/2012 | Chang et al. | 398/208 |
| 2012/0189319 A1* | 7/2012 | Mo et al. | 398/152 |
| 2012/0275797 A1* | 11/2012 | Li et al. | 398/152 |
| 2013/0330070 A1* | 12/2013 | Yu | 398/16 |
| 2014/0079407 A1* | 3/2014 | Dou et al. | 398/149 |

FOREIGN PATENT DOCUMENTS

| | | |
|---|---|---|
| CN | 1688146 | 10/2005 |
| CN | 101248588 | 8/2008 |

OTHER PUBLICATIONS

Meng Yan, et al., Adaptice Blind Equalization for Coherent Optical BPSK System, ICOC, Sep. 19-23, 2010.
Irshaad Fatadin, et al., "Blind Equalization and Carrier Phase Recovery in a 16-QAM Optical Coherent System," Journal of Lightwave Technology, vol. 27, No. 15, Aug. 1, 2009, pp. 3042-3049.
Chinese Office Action dated Aug. 3, 2015 in corresponding Chinese Patent Application No. 201210342454.8.
Extended European Search Report dated Oct. 2, 2015 in corresponding European Patent Application No. 13183503.5.
Chinese Office Action dated Jan. 18, 2016 in corresponding Chinese Patent Application No. 201210342454.8.

* cited by examiner

*Primary Examiner* — Agustin Bello
(74) *Attorney, Agent, or Firm* — Staas & Halsey LLP

(57) ABSTRACT

The present invention provides an updating apparatus and method for an equalizer coefficient, receiver and optical communication system. The updating method comprises: receiving an optical signal transmitted by a transmitter in an optical communication system, the optical signal comprising transmission data and a constant modulus signal for updating a coefficient of an equalization filter; performing coherent detection and analog-to-digital conversion on the optical signal, so as to obtain a digital electric signal; and updating the coefficient of the equalization filter at a symbol corresponding to the constant modulus signal in the digital electric signal. With the embodiments of the present invention, not only the coefficients of the equalizer may be optimized, but also being adapted to signals in various modulation formats, and the complexity of the channel equalization may be lowered as well.

10 Claims, 11 Drawing Sheets

UPDATING APPARATUS AND METHOD FOR EQUALIZER COEFFICIENT, RECEIVER AND OTPICAL COMMUNICATION SYSTEM

CROSS REFERENCE TO RELATED APPLICATIONS

This application claims the benefit of Chinese Application No. 201210342454.8, filed Sep. 14, 2012, the disclosure of which is incorporated herein by reference.

TECHNICAL FIELD

The present invention relates to the field of optical communication and, in particular to an updating apparatus and a method for an equalizer coefficient, a receiver and an optical communication system.

BACKGROUND ART

As the development of high-speed digital analog converter (DAC) chips, analog digital converter (ADC) chips and digital signal processing (DSP) chips, the coherent optical communication technology has become a main stream trend of the next generation optical communication. Quadruple spectrum efficiency improvement relative to conventional modulation formats (OOK, on-off keying) may be realized by using an optical in-phase quadrature (I/Q) modulator to map transmission information onto a quadrature phase shift keying (QPSK) constellation and then being polarization-multiplexed.

As all kinds of linear and nonlinear damage exist in an optical fiber link, equalization and compensation need to be performed on a received signal at a receiver side. Although a coherent optical receiver may obtain electrical field information of an optical signal, due to a frequency difference and a phase difference between a local oscillator laser and a transmitting laser, a constant modulus algorithm (CMA) insusceptible to phases is often used as an equalization algorithm at the receiver side.

The basic idea of the CMA is to equalize a received signal by using a linear filter, and coefficients of the linear filer are updated in an iterative manner, the principle of updating being to make difference between the modulus of the equalized signal and a predetermined value be minimum. The CMA may effectively achieve polarization demultiplexing and matching filtering, as well as equalizing residual dispersion and polarization mode dispersion in an optical fiber link. In a case where an updated step is relatively small, the error of an equalized signal is close to a minimum mean-squared error (MMSE). In practical use, for further reducing the complexity, a down-sample manner may be used in updating a CMA coefficient (i.e. an equalizer coefficient), that is, updating is performed every k symbols.

Currently, as requirements on spectrum efficiency are increasing, how to achieve a modulation format with a higher order in an optical communication system becomes a hot spot of interest. For complex modulation formats, such as 16QAM, and 32QAM, etc., an important issue is how to achieve equalization. As these modulation formats satisfy constant modulus conditions no longer, in a case where the CMA is directly used, an optimal linear equalization filter cannot be obtained, even though the coefficients of the CMA are converged.

Various solutions regarding the above issue have been proposed. One of them is a CMA based on multiple moduli, the basic idea thereof being to increase the number of predetermined moduli to n, where, n is equal to the number of different moduli for transmitting signals; for example, in 16QAM, n=3. In calculating an error, the differences between the currently outputted moduli and n predetermined moduli are compared, and a modulus of a minimum difference is selected for subsequent coefficient updating. Another solution is based on decision feedback, wherein after a method of initial convergence is used, when the decided result is deemed as correct modulation information, coefficients of the equalization filter are further adjusted according to the errors before and after the decision.

However, in the implementation of the present invention, the inventors found that drawbacks exist in the prior art: the method of multiple moduli CMA is very complex, and it is not transparent to the transmitted modulation formats, which is because the constellation of the transmission signal decides the sizes and number of the predetermined moduli. And the method based on decision feedback is also very complex, and it is disadvantageous to the parallel realization of the algorithms, for feedback introduced into the whole processing of signals.

Documents advantageous to the understanding of the present invention and the prior art are listed below, which are incorporated herein by reference, as they are fully described herein.

[Document 1]: Irshaad Fatadin, David Ives, and Seb J. Savory, "Blind Equalization and Carrier Phase Recovery in a 16-QAM Optical Coherent System," *Journal Of Lightwave Technology*, 3042, VOL. 27, NO. 15, Aug. 1, 2009; and

[Document 2]: Meng Yan, Zhenning Tao, Huijian Zhang Weizhen Yan, Takeshi Hoshida and Jens C. Rasmussen, "Adaptive Blind Equalization of Optical BPSK system," Th9A4, ECOC, 2010.

SUMMARY OF THE INVENTION

Embodiments of the present invention provide an updating apparatus and a method for an equalizer coefficient, a receiver and an optical communication system, with an object being to be adapted to equalization of signals in various modulation formats, and lower complexity of channel equalization.

According to an aspect of the embodiments of the present invention, an updating apparatus for an equalizer coefficient is provided, comprising:

a signal receiver, configured to receive an optical signal transmitted by a transmitter in an optical communication system, the optical signal comprising transmission data and a constant modulus signal for updating a coefficient of an equalization filter;

a signal processor, configured to perform coherent detection and analog-to-digital conversion on the optical signal, so as to obtain a digital electric signal; and a coefficient updater, configured to update the coefficient of the equalization filter at a symbol corresponding to the constant modulus signal in the digital electric signal.

According to another aspect of the embodiments of the present invention, an updating method for an equalizer coefficient is provided, comprising:

receiving an optical signal transmitted by a transmitter in an optical communication system, the optical signal comprising transmission data and a constant modulus signal for updating a coefficient of an equalization filter;

performing coherent detection and analog-to-digital conversion on the optical signal, so as to obtain a digital electric signal; and updating the coefficient of the equalization filter at a symbol corresponding to the constant modulus signal in the digital electric signal.

According to still another aspect of the embodiments of the present invention, a receiver is provided, comprising:

a signal receiver, configured to receive an optical signal transmitted by a transmitter in an optical communication system, the optical signal comprising transmission data and a constant modulus signal for updating a coefficient of an equalization filter;

a coherent detector, configured to perform coherent detection on the optical signal, so as to obtain an electric signal;

an analog-to-digital converter, configured to perform analog-to-digital conversion on the electric signal, so as to obtain a digital electric signal;

an equalization filer, configured to equalize the digital electric signal; and a coefficient updater, configured to update the coefficient of the equalization filter at a symbol corresponding to the constant modulus signal in the digital electric signal.

According to yet another aspect of the embodiments of the present invention, an optical communication system is provided, comprising the receiver as described above, wherein the optical communication system further comprises:

a transmitter, configured to modulate and transmit an optical signal, the optical signal comprising transmission data and a constant modulus signal for updating a coefficient of an equalization filter.

The advantages of the embodiments of the present invention exist in that: by adding a constant modulus signal into a transmission signal and updating an equalizer coefficient only on the constant modulus signal when channel equalization is performing, not only the coefficient of the equalizer may be optimized, but also being adapted to signals in various modulation formats, and the complexity of the channel equalization may be lowered as well.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF THE INVENTION

Various embodiments of the present invention are described as follows with reference to the drawings. These embodiments are illustrative only and are not intended to limit the present invention. For easy understanding of the principle and embodiments of the present invention by those skilled in the art, the embodiments of the present invention are described taking an optical communication system as an example. However, it should be understood that the present invention is applicable to all the communication systems where nonlinear damages exist.

Embodiment 1

Figure 1:
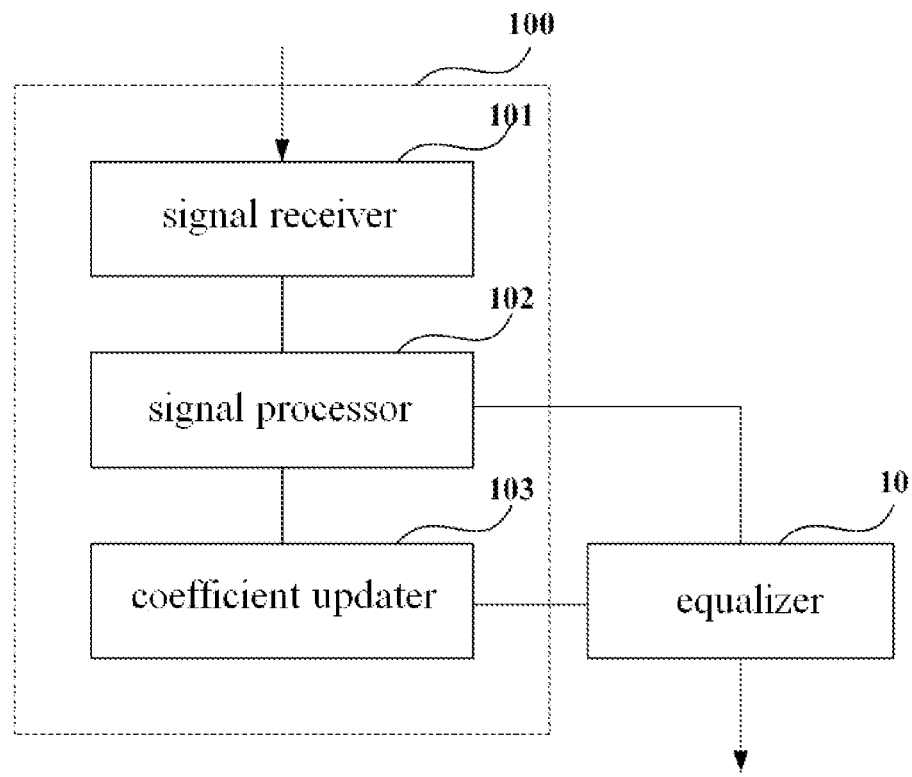
FIG. 1 is a schematic diagram of the structure of the updating apparatus for an equalizer coefficient of an embodiment of the present invention.

An embodiment of the present invention provides an updating apparatus for an equalizer coefficient. FIG. 1 is a schematic diagram of the structure of the updating apparatus for an equalizer coefficient of the embodiment of the present invention. As shown in FIG. 1, an updating apparatus 100 updates an coefficient of an equalizer 10 at a receiver side, and comprises a signal receiver 101, a signal processor 102 and a coefficient updater 103.

In this case, the signal receiver 101 receives an optical signal transmitted by a transmitter in an optical communication system, the optical signal comprising transmission data and a constant modulus signal for updating a coefficient of an equalization filter, the signal processor 102 performs coherent detection and analog-to-digital conversion on the optical signal, so as to obtain a digital electric signal, and the coefficient updater 103 updates the coefficient of the equalization filter at a symbol corresponding to the constant modulus signal in the digital electric signal.

In this embodiment, the updating apparatus 100 may be applicable to the receiver side in the optical communication system, the receiver comprising the equalizer 10, and the updating apparatus 100 may update a coefficient of the equalizer 10.

In this embodiment, the receiver in the optical communication system may modulate and transmit transmission data, the transmission data may be in any modulation formats, such as a modulation manner of nonconstant modulus modulation, for example, 16QAM, 32QAM, or 8APSK, etc. And a constant modulus signal may be added into an optical signal, the constant modulus signal may be in a modulation manner of QPSK or 8PSK; however, the present invention is not limited thereto, and only the characteristic of constant modulus of the constant modulus signal needs to be ensured.

Figure 2:
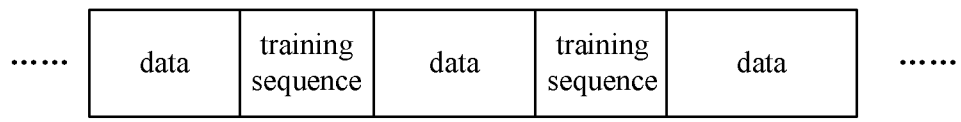
FIG. 2 is a schematic diagram of the frame structure of the optical signal of an embodiment of the present invention.

FIG. 2 is a schematic diagram of the frame structure of the optical signal of the embodiment of the present invention. As shown in FIG. 2, a training sequence of constant modulus (for example, QPSK symbols) may be proportionally added into the transmission data (for example, nonconstant modulus modulated 16QAM symbols), where, the data denote data that are transmitted in any formats, for example, 16QAM, and 8APSK, etc., and the training sequence denotes data that are pure phase modulated, such as QPSK, and 8PSK, etc.

It should be noted that in the frame structure shown in FIG. 2, the training sequence of constant modulus is periodically added into the transmission data; however, the present invention is not limited thereto, and constant modulus signals may also be aperiodically added, only if the coefficients are updated at the symbols corresponding to the constant modulus signals in the receiver side.

Different from a conventional method of training sequence, the method of the present invention uses only the characteristic that the training sequence is of constant modulus, and does not require that the training sequence is a specific sequence, nor requires the training sequences are identical, and even more, the training sequence may be used to transmit data information. Hence, the CMA can still be used in channel equalization, which may greatly lower the complexity of the equalization, and may be applicable to signals in any modulation formats.

In particular implementation, the training sequence may be mapped as a subset in a constellation of actually transmitted data, so as to produce data in two different modulation formats.

Figure 3:
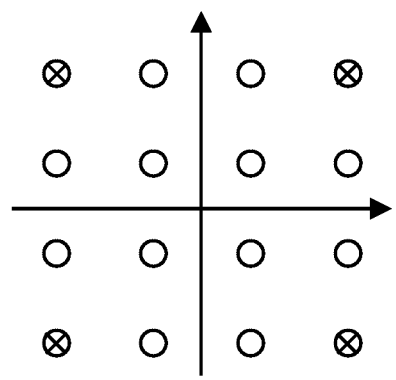
FIG. 3 is a constellation of transmission data and a training sequence of an embodiment of the present invention.

FIG. 3 is a constellation of transmission data and a training sequence of the embodiment of the present invention, where, ⊗ denotes the training sequence of constant modulus, and ○ denotes the transmission data. As shown in FIG. 3, the transmission data may be 16QAM, and the training sequence is four points at the outermost circle, forming QPSK.

Figure 4:
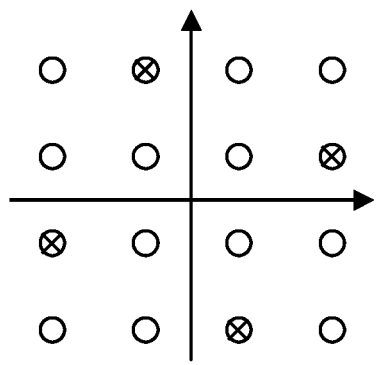
FIG. 4 is another constellation of transmission data and a training sequence of an embodiment of the present invention.

FIG. 4 is another constellation of transmission data and a training sequence of the embodiment of the present invention, where, ⊗ denotes the training sequence of constant modulus, and ○ denotes the transmission data. As shown in FIG. 4, the transmission data may be 16QAM, and the training sequence is four points at the intermediate circle, forming QPSK.

Figure 5:
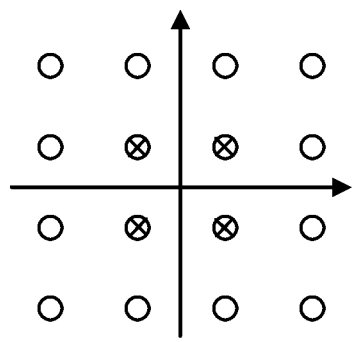
FIG. 5 is still another constellation of transmission data and a training sequence of an embodiment of the present invention.

FIG. 5 is still another constellation of transmission data and a training sequence of the embodiment of the present invention, where, ⊗ denotes the training sequence of constant modulus, and ○ denotes the transmission data. As shown in FIG. 5, the transmission data may be 8APSK, and the training sequence is four points at the innermost circle, forming QPSK.

FIGS. 3-5 show constellation selection of three different training sequences, where the transmission data is 16QAM. In these cases, the training sequences are all QPSK; however, QPSK may be at the outer circle, the intermediate circle, or the inner circle, respectively, according to properties of constellation of 16QAM.

In the present invention, only the amplitude of the training sequence is defined, and there is no requirement on its angular distribution. That is, only if it is ensured that the training sequence satisfies the characteristic of constant modulus.

Figure 6:
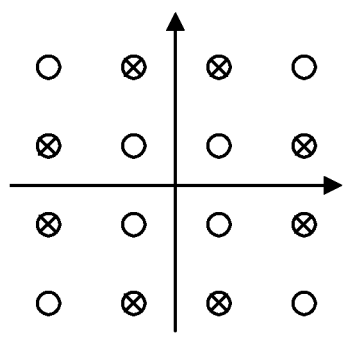
FIG. 6 is further still another constellation of transmission data and a training sequence of an embodiment of the present invention.

FIG. 6 is further still another constellation of transmission data and a training sequence of the embodiment of the present invention. As shown in FIG. 6, the transmission data may be 16QAM, and the training sequence is eight points at the intermediate circle. All the eight points at the intermediate circle in the constellation of 16QAM are used in FIG. 6 as the training sequence. The eight points are not evenly distributed at the circumference; however, their moduli are constant. Therefore, they can still be equalized by using the method of the present invention.

Figure 7:
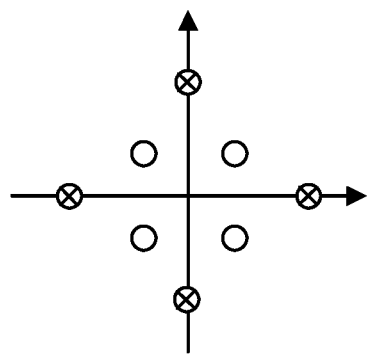
FIG. 7 is further still another constellation of transmission data and a training sequence of an embodiment of the present invention.

FIG. 7 is further still another constellation of transmission data and a training sequence of the embodiment of the present invention. As shown in FIG. 7, the transmission data may be 8APSK, and the training sequence is four points at the outermost circle, forming QPSK. FIG. 7 is a constellation of 8APSK, wherein the training sequence is distributed at the outer circle.

Figure 8:
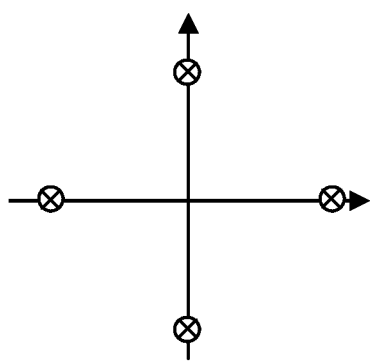
FIG. 8 is further still another constellation of transmission data and a training sequence of an embodiment of the present invention.

FIG. 8 is further still another constellation of transmission data and a training sequence of the embodiment of the present invention. As shown in FIG. 8, the transmission data may be BPSK, and the training sequence is four points. FIG. 8 shows that the transmission signals are of BPSK, and the BPSK symbols are only located at the horizontal axis. Although BPSK itself also satisfies the characteristic of constant envelope, equalization failure will occur in actual equalization. Therefore, two points may be added to expand the training sequence to QPSK, and hence equalization is performed by using the method proposed in the present invention.

It should be noted that FIGS. 3-8 schematically show how to add constant modulus signals into the transmission signals. However, the present invention is not limited thereto, and a particular manner of implementation may be determined as actually required.

In this embodiment, the transmitter may map the original information by using the constellation, and then input into a transmission link after pulse shaping and modulation. The signals transmitted via the optical fiber link and degraded by various linear and nonlinear damages enter into a coherent optical receiver. The optical signals may be sent to a digital signal processor (DSP) chip for further digital domain processing after being subjected to coherent detection and analog-to-digital conversion in turn.

In this embodiment, the signal processor 102 may perform coherent detection and analog-to-digital conversion, and the prior art may be referred to for particular implementation. The coefficient updater 103 may be a part of the DSP chip, and the functions of which may be carried out by the DSP chip.

In particular implementation, the receiver carries out channel equalization via an equalizer. The channel equalization may consist of two parts: a linear filter of fixed coefficients and an adaptive butterfly linear filter. In this case, the linear filter of fixed coefficients is configured to compensate for large dispersion in the optical fiber link, and the adaptive butterfly linear filter is configured to compensate for residual dispersion and polarization mode dispersion and fulfill polarization demultiplexing.

Figure 9:
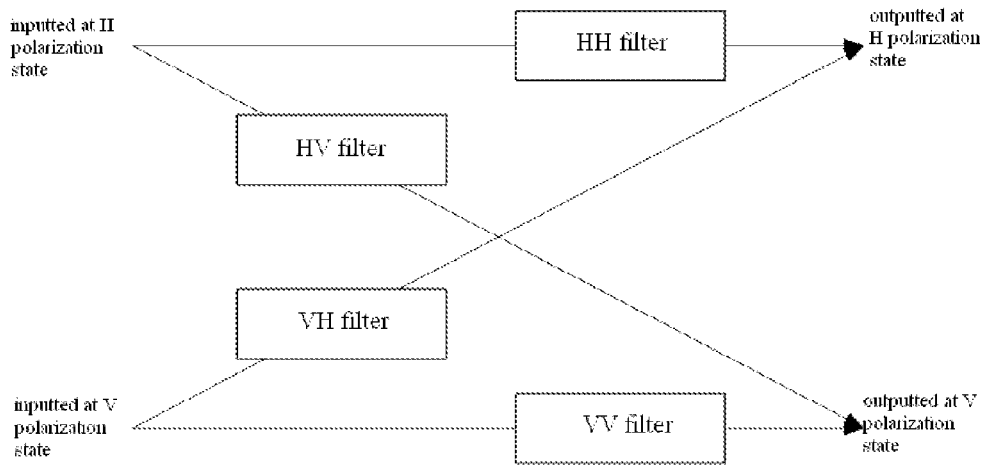
FIG. 9 is a schematic diagram of the structure of the butterfly linear filter for equalization of an embodiment of the present invention.

The present invention shall be described below in detail taking updating coefficients of an adaptive butterfly linear filter as an example. In this embodiment, the adaptive butterfly linear filter performs equalization based on a CMA. FIG. 9 is a schematic diagram of the structure of the butterfly linear filter for equalization of the present invention, which is taken as an example of an equalizer. As shown in FIG. 9, an input signal may be passed through the butterfly linear filter (HH, HV, VH, VV), then the difference between the modulus of the output signal and a predetermined value is compared, and the coefficients of the butterfly linear filter are updated according to the difference. The process of updating is shown in formula (1)-(3) below.

In formula (1), $H_0$ and $V_0$ denote signals inputted at H and V polarization states, and $H_1$ and $V_1$ denote signals outputted by the equalizer. $f_{HH}$, $f_{HV}$, $f_{VH}$ and $f_{VV}$ are four linear filters in the equalizer, respectively, which form the structure of the butterfly filter.

$$H_1 = H_0 \otimes f_{HH} + V_0 \otimes f_{HV}$$

$$V_1 = H_0 \otimes f_{VH} + V_0 \otimes f_{VV} \quad (1)$$

Formula (2) is used to calculate an error between the output of the equalizer and a predetermined modulus λ at the current moment n.

$$e_H(n) = |H_1(n)|^2 - \lambda$$

$$e_V(n) = |V_1(n)|^2 - \lambda \quad (2)$$

The coefficients of the four filters are further updated to the next moment n+1 according to the error signals at the two polarization states obtained by using formula (2), as shown in formula (3). Where, μ represents an updated step, and k represents a k-th coefficient of a filter.

$$f_{HH}(n+1,k) = f_{HH}(n,k) + \mu e_H(n) H_1(n) H_0^*(n-k)$$

$$f_{HV}(n+1,k) = f_{HV}(n,k) + \mu e_H(n) H_1(n) V_0^*(n-k)$$

$$f_{VH}(n+1,k) = f_{VH}(n,k) + \mu e_V(n) V_1(n) H_0^*(n-k)$$

$$f_{VV}(n+1,k) = f_{VV}(n,k) + \mu e_V(n) V_1(n) V_0^*(n-k) \quad (3)$$

Therefore, a conventional CMA method needs to update each of the coefficients of the four filters at each time point n. It can be seen from formula (2) that the final convergence state of the CMA is to make the modulus of the output signal of the equalizer to be equal to the predetermined value. When a transmission signal is of a constant modulus, it is undoubted that the CMA is effective. However, when a transmission signal is any modulation signal, the characteristic of constant modulus is satisfied no longer. Although the CMA can still work, the coefficient of the final algorithm convergence is not optimal, and hence the performance of the output of the equalizer is not optimal, too.

While in this embodiment, constant modulus signals (pure phase modulated symbols) are added to the fixed positions of the transmission signals, while ensuring that the CMA performs coefficient updating only on the pure phase modulated symbols, so as to process signals in any modulation formats, thereby utilizing the performance of blind equalization of the CMA, and obtaining optimal performances. In comparison with a conventional solution in which updating is performed at every time point, the tracking speed of formula (2) of the present invention may likely be lowered, as filter coefficient updating is performed only on the fixed pure phase modulated training sequence. However, as the symbol rate of an optical communication system can reach decades of GBs of bauds, and the speed of an actual link change is lower than a level of MHz, such a fall of tracking speed will bring no severe issue.

It should be noted that for the updating of coefficients of a butterfly linear filter by using a CMA, what is described above is illustratively only, the present invention is not limited thereto, and a particular manner of implementation may be determined as actually required.

It can be seen from the above embodiment that: by adding constant modulus signals into transmission signals and updating equalizer coefficients only at the constant modulus signals in channel equalization, not only the coefficients of the equalizer may be optimized, but also being adapted to signals in various modulation formats, and the complexity of the channel equalization may be lowered as well.

Embodiment 2

On the basis of Embodiment 1, an embodiment of the present invention further provides an updating apparatus for an equalizer coefficient, in which the same contents as those in Embodiment 1 shall not be described any further.

Figure 10:
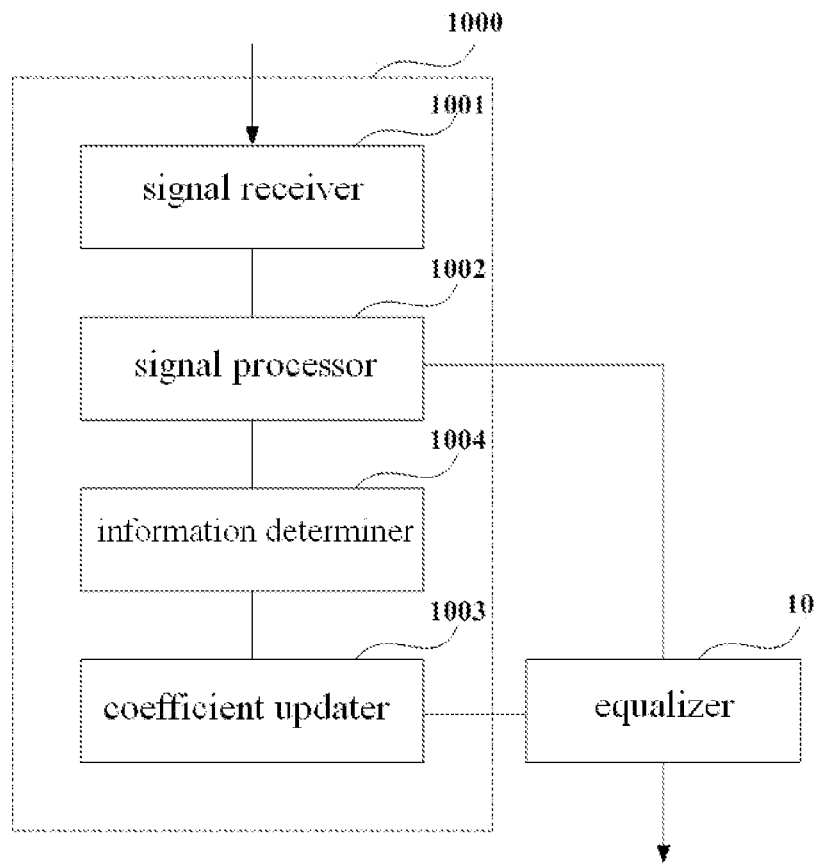
FIG. 10 is another schematic diagram of the structure of the updating apparatus for an equalizer coefficient of an embodiment of the present invention.

FIG. 10 is another schematic diagram of the structure of the updating apparatus for an equalizer coefficient of an embodiment of the present invention. As shown in FIG. 10, an updating apparatus 1000 updates a coefficient of the equalizer 10, and comprises a signal receiver 1001, a signal processor 1002 and a coefficient updater 1003, as described above in Embodiment 1.

As shown in FIG. 10, the updating apparatus 1000 may further comprise an information determiner 1004 configured to determine whether a symbol in a digital electric signal is a symbol which corresponds to a constant modulus signal according to symbol timing.

In this embodiment, whether a symbol corresponds to a constant modulus signal may be determined by symbol timing. For example, it may be aperiodically provided that the first, the 10th, the 100th symbols, . . . correspond to the constant modulus signals; or it may be periodically provided that each frame comprises 8 symbols, and the 7th symbol of each frame corresponds to the constant modulus signals, etc. However, the present invention is not limited thereto, and a particular manner of implementation may be determined as actually required.

In this embodiment, after the information determiner 1004 determines the symbols corresponding to the constant modulus signals, the coefficient updater 1003 may updates the coefficients of the equalization filter at the symbols by using the CMA. The prior art may be referred to for particular implementation.

Figure 11:
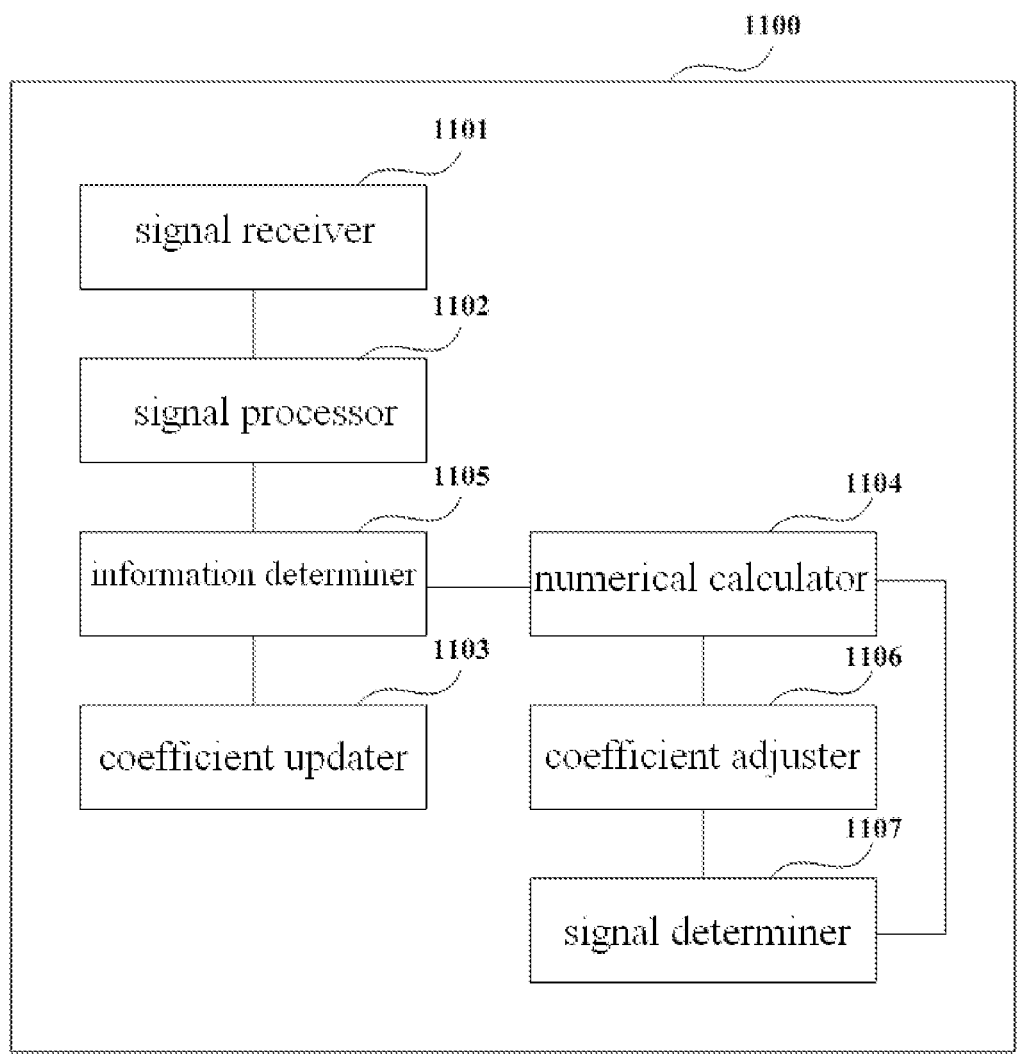
FIG. 11 is still another schematic diagram of the structure of the updating apparatus for an equalizer coefficient of an embodiment of the present invention.

FIG. 11 is still another schematic diagram of the structure of the updating apparatus for equalizer coefficients of an embodiment of the present invention, in which the equalizer of the receiver is not shown for the simplicity of description. As shown in FIG. 11, an updating apparatus 1100 comprises a signal receiver 1101, a signal processor 1102 and a coefficient updater 1103, as described above in Embodiment 1.

As shown in FIG. 11, the updating apparatus 1100 may further comprise a numerical calculator 1104 and an information determiner 1105. The numerical calculator 1104 detects output signals of the equalization filter, so as to calculate average values and/or variance of moduli of the signals; and the information determiner 1105 determines whether the symbols in the digital electric signals are the symbols which correspond to the constant modulus signals according to the average values and/or variance.

In this embodiment, the tolerance of the equalizer to the timing error may be improved by calculating average values and/or variance of moduli of the signals. As the CMA can also find a group of non-ideal equalizer coefficients in the transmission data (such as QAM symbols) inputted, the coefficients may not ensure that the system operates at an optimal state, but can still be equalized roughly.

Taking that the transmission data are QAM symbols and the constant modulus signals are PSK symbols as an example, as the PSK symbols themselves have the characteristic of constant modulus, and the QAM symbols are not of constant modulus, in such a group of non-ideal equalizer coefficients, the monitoring signals (moduli or error signals of a CMA) to which the PSK symbols correspond are much smaller than the monitoring signals to which the QAM symbols correspond, and hence whether the current moment is a PSK symbol or a QAM symbol may be differentiated by monitoring temporal average values (or variance) of each point outputted by the equalizer.

It is assumed that a format of a transmission signal is that there exist k consecutive PSK symbols and n-k consecutive QAM symbols in every n symbols. And an updating period of CMA coefficients (i.e. coefficients of the equalizer) is n symbols. First, the moduli of equalized n symbols may be calculated and m frames (each frame containing n symbols) may be consecutively calculated; and then average values or variance of the moduli at each of the positions (1-n) are calculated, respectively.

Figure 12:
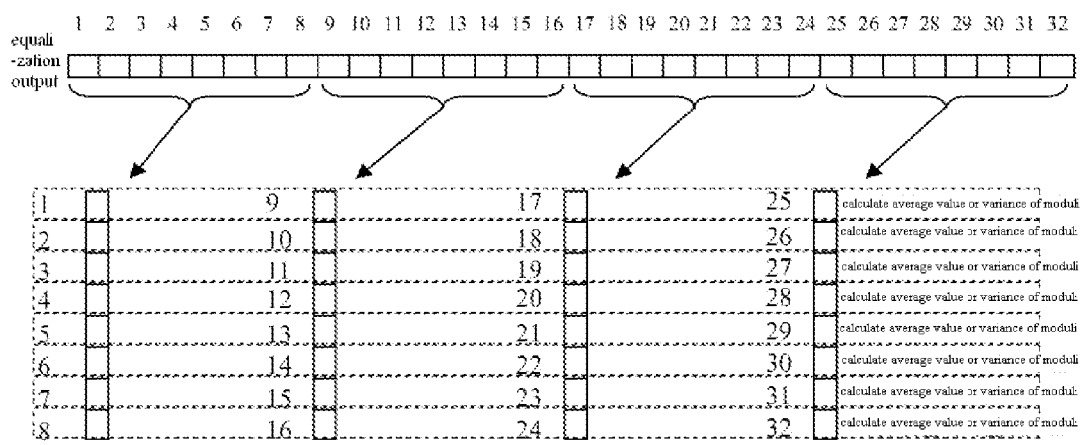
FIG. 12 is a schematic diagram of calculating an average value and/or variance of an embodiment of the present invention.

FIG. 12 is a schematic diagram of calculating an average value and/or variance of an embodiment of the present invention, which shall be described by way of an example. As shown in FIG. 12, assuming that n=8, m=4, k=1, average values or variance of the moduli of the output signals of the CMA equalization at these 8 positions will be finally obtained.

In particular implementation, the numerical calculator 1104 may detect one or more predetermined symbols in each frame of the output signals. That is, in practical application, calculation of average values or variance at part of the moments may only be performed. For example, when the PSK signals are placed at the last one of every 8 symbols in the transmission sequence, the average values or variance at the 8th symbol position may only be calculated, so as to determine whether the current point is a PSK signal.

In particular implementation, the average values or variance of the moduli of the PSK and QAM symbols may be calculated by using the points in the constellation. And the average value of the moduli of the QAM symbols may be an average of the moduli of all the points in the constellation. For general QAM symbols, there are multiple moduli. Therefore, even though the receiver sends out no noise, the variance of the moduli of the QAM symbols exists, and may be calculated by using a constellation. And the PSK signals are constant modulus signal, and the variance of their moduli is 0.

How to determine whether a current symbol is PSK or QAM according the average value or variance of a modulus shall be described below with reference to the three cases shown in FIGS. 3-5.

(A) when a transmission constellation is as shown in FIG. 3, assuming that the minimum unit in the constellation is normalized as 1, the average value of the moduli of the QAM symbols is sqrt (10), and the PSK signals are all at the outermost circle, hence, the average value of the moduli of the PSK signals is sqrt (18); determination may be performed directly by using the two average values;

(B) when a transmission constellation is as shown in FIG. 4, the moduli of the QAM and PSK symbols are identical, that are sqrt (10); the variance of the moduli of the QAM is approximately 1; determination may be performed by using the difference of the variance;

(C) when a transmission constellation is as shown in FIG. 5, the average value of the moduli of the QAM symbols is sqrt (10), and the PSK signals are all at the innermost circle (10), hence, the average value of the moduli of the PSK signals is sqrt (2); determination may be performed directly by using the two average values.

In practical application, as the error signal outputted by the CMA may be the square of the modulus of the current symbol subtracted by the predetermined value, the signal may directly used to determine the attribute of the current symbol. Following is the details:

(A) when a transmission constellation is as shown in FIG. 3, assuming that the minimum unit in the constellation is 1, and the predetermined value may be 18, the average value of the CMA errors of the QAM symbols is −8, and the PSK signals are all at the outermost circle, hence, the average value of the CMA errors of the PSK signals is 0; determination may be performed directly by using the two average values;

(B) when a transmission constellation is as shown in FIG. 4, the predetermined value may be 10, the average values of the CMA errors of the QAM and PSK symbols are identical, that are 0; the variance of the CMA errors of the QAM is approximately 1; determination may be performed by using the difference of the variance;

(C) when a transmission constellation is as shown in FIG. 5, the predetermined value may be 2, and the average value of the CMA errors of the QAM symbols is 8; the PSK signals are all at the innermost circle, hence, the average value of the CMA errors of the PSK signals is 0; determination may be performed directly by using the two average values.

The characteristic of the current symbol may be determined according to the above rules, and the CMA coefficients may be updated more accurately by using such the characteristic. It should be noted that how to calculate an average value or variance of moduli is illustratively described above by way of examples; however, the present invention is not limited thereto.

Therefore, the symbols corresponding to the constant modulus signals can not only be designated by using initial symbol timing, but also be further specified by using an average value and variance of CMA error signals. This undoubtedly expands tolerance of the equalizer to the timing error of a former timing module. It should be pointed out that when polarization multiplexing signals are transmitted, due to the existence of time delay of a differential group in the link, it is possible that the moments of existence of the constant modulus signals at the two polarization states are different. At this time, the coefficient updating at the two polarization states may be performed based on the symbols at different moments.

In this embodiment, as shown in FIG. 11, the updating apparatus 1100 may further comprise a coefficient adjuster 1106, which adjusts the equalization filter coefficients according to the calculated average values and/or variance.

In this embodiment, the coefficients of the CMA may further be adjusted by using the method of CMA error signal. In practice, timing errors would exist in the receiver, and at the same time, time delay of a differential group possibly exists in the link. It is possible that both of the two factors result in that the CMA misdetermines the transmission data (such as the QAM signals) as the constant modulus signals (such as the PSK signals) and performs the coefficient updating.

It can be seen from the above contents that the type of the current symbols (for example, PSK or QAM) may be specifically determined by using the average value or variance of the CMA error signals and in combination with particular formats of the transmission signals.

In practical application, in order to lower the complexity of the operation, the average value or variance of the CMA error signals to which the lengths of the PSK symbols correspond may only be taken into consideration. For example, when there are k PSK symbols in n transmitted symbols, k symbols outputted by the equalizer may only be monitored, and an average value or variance is calculated.

If a time delay of a differential group exists in the link or a timing error exists in the receiver, the k symbols in the equalizer selected for monitoring are not necessarily PSK symbols. As the CMA equalization is often a digital filter of multiple coefficients, the temporal translation of output symbols may be achieved by coefficient translation. An effective method of using current symbol type information is to adjust CMA coefficients, which shall be described below taking dual-polarization state signals as an example.

Figure 13:
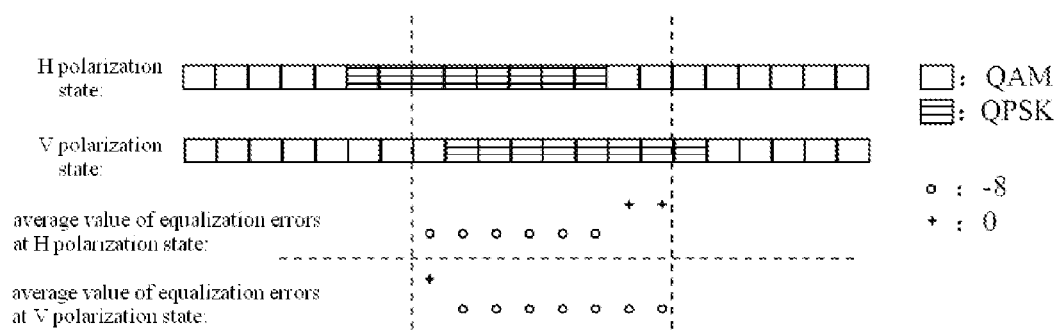
FIG. 13 is a schematic diagram of an average value of errors at the two polarization states of an embodiment of the present invention.

FIG. 13 is a schematic diagram of error average values at the two polarization states of an embodiment of the present invention. As shown in FIG. 13, assuming that there are 8 consecutive PSK symbols in every n symbols, as shown in the constellation of FIG. 3, the time delay of the differential group in the link results in that there exists a time delay of 3 symbols between the two polarization states (between H and V), and the 8 PSK symbols considered by the equalizer due to the clock synchronization error in the receiver are as shown between the dotted lines in FIG. 13.

An average value of CMA errors at each of the polarization states may be obtained by using the method of the calculation as shown above. As it has been stipulated that the PSK signals are 8 consecutive symbols, it can obviously seen from the average value of the CMA errors that the output at the H polarization state needs 2 symbols to be translated leftwards, and the output at the V polarization state needs 1 symbol to be translated rightwards. The coefficients of the CMA filter may be respectively adjusted according to this information, translating leftwards the coefficients of the filters $f_{HH}$ and $f_{HV}$ by 2 symbols, and at the same time, translating rightwards the coefficients of the filters $f_{VH}$ and $f_{VV}$ by 1 symbol.

An example of an average value of CMA errors is schematically given above, and the cases in practice are more complex. Generally speaking, when there are consecutive constant modulus signals (such as PSK signals) in transmission signals, coefficients may be adjusted by using similar methods.

As shown in FIG. 11, the updating apparatus 1100 may further comprise a signal determiner 1107 which determines whether constant modulus signals exist in dual polarization state signals outputted by the equalization filter; and the coefficient adjuster 1106 respectively adjusts the equalization filter coefficients according to the distribution of the dual polarization state constant modulus signals when constant modulus signals exist in the dual polarization state signals, and adjusts simultaneously the equalization filter coefficients according to the distribution of the constant modulus signals in the polarization state in which constant modulus signals exist when constant modulus signals exist in one polarization state and do not exist in the other polarization state.

In particular implementation, if the output at the two polarization states contains no PSK signal, it shows that the current timing error is greater than k PSK symbols, and hence, the direction of adjustment of the coefficients cannot be determined according to the current output. For such a case, the range of calculation of the average value of the CMA output error may be enlarged, so as to further determine the current timing error. If there is a route of PSK signals in the two currently outputted polarization states and there is no PSK signal in the other route, it shows that both timing error and time delay of differential group exist currently. As the polarization branch with no PSK signal cannot provide a direction of adjustment of the coefficients, the CMA coefficient adjustment values of this route may be set to be the same as those of the polarization branch containing PSK signals. At this time, the coefficient adjustment direction to which the polarization branch containing PSK signals corresponds is the direction of the existence of the QAM signals, and the adjustment values are the number of the QAM signals, that is, by adjustment, all the outputted signals may be made as PSK signals. If the output at the two polarization states contains PSK signals, CMA filter coefficient adjustment may be performed according to the distribution of the QAM and PSK signals of itself.

In particular implementation, the above adjustment may only be a step of the CMA coefficient updating. In practical application, it is often needed to continue with the CMA coefficient updating on the basis of such adjustment, as described above. It should be noted that the coefficient adjustment is schematically described above taking dual polarization states as an example. However, the present invention is not limited thereto, and for single polarization state signals, the coefficient adjustment or updating may also be performed similarly.

It can be seen from the above embodiment that by adding constant modulus signals into transmission signals and updating equalizer coefficients only at the constant modulus signals in channel equalization, not only the coefficients of the equalizer may be optimized, but also being adapted to signals in various modulation formats, and the complexity of the channel equalization may be lowered as well.

And the type of a current symbol may be determined by calculating average values or variance of the moduli of the equalization output signals, thereby more effectively positioning constant modulus signals, and furthermore improving tolerance to the timing error of the receive and the time delay of the differential group of the link.

Furthermore, the equalizer coefficients may be adjusted or updated by calculating average values or variance of the moduli of the equalization output signals, and the requirements on the timing error of the receive and the time delay of the differential group of the link may also be lowered.

Embodiment 3

On the basis of embodiments 1 and 2, an embodiment of the present invention further provides a receiver and an optical communication system, in which the same contents as those in Embodiment 1 or 2 shall not be described any further.

Figure 14:
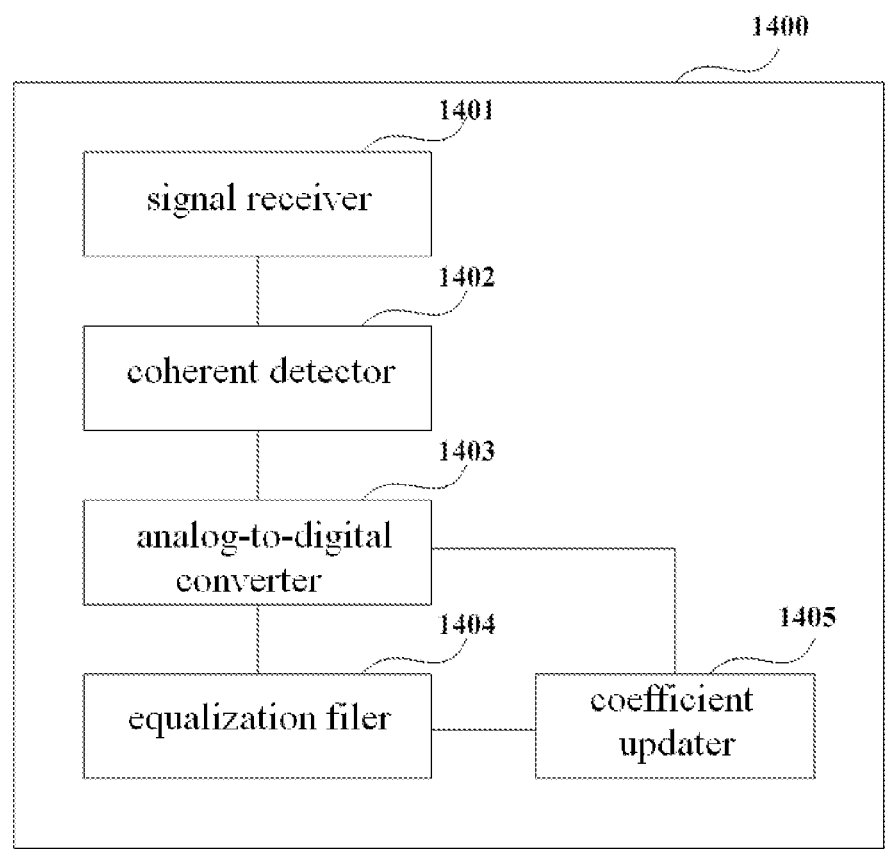
FIG. 14 is a schematic diagram of the structure of the receiver of an embodiment of the present invention.

FIG. 14 is a schematic diagram of the structure of the receiver of the embodiment of the present invention. As shown in FIG. 14, the receiver 1400 comprises a signal receiver 1401, a coherent detector 1402, an analog-to-digital converter 1403, an equalization filer 1404 and a coefficient updater 1405. Other parts of the receiver may refer to the prior art, and shall not be described herein any further.

In this case, the signal receiver 1401 receives an optical signal transmitted by a transmitter in an optical communication system, the optical signal comprising transmission data and a constant modulus signal for updating a coefficient of an equalization filter; the coherent detector 1402 performs coherent detection on the optical signal, so as to obtain an electric signal; the analog-to-digital converter 1403 performs analog-to-digital conversion on the electric signal, so as to obtain a digital electric signal; the equalization filer 1404 equalizes the digital electric signal; and the coefficient updater 1405 updates the coefficient of the equalization filter at a symbol corresponding to the constant modulus signal in the digital electric signal.

In this embodiment, such modulation formats as 16QAM, 32QAM or 8APSK, may be used for the transmission data, and such modulation formats as QPSK or 8PSK may be used for the constant modulus signals; however, the present invention is not limited thereto.

An embodiment of the present invention further provides an optical communication system, comprising a transmitter and the receiver as described above.

Figure 15:
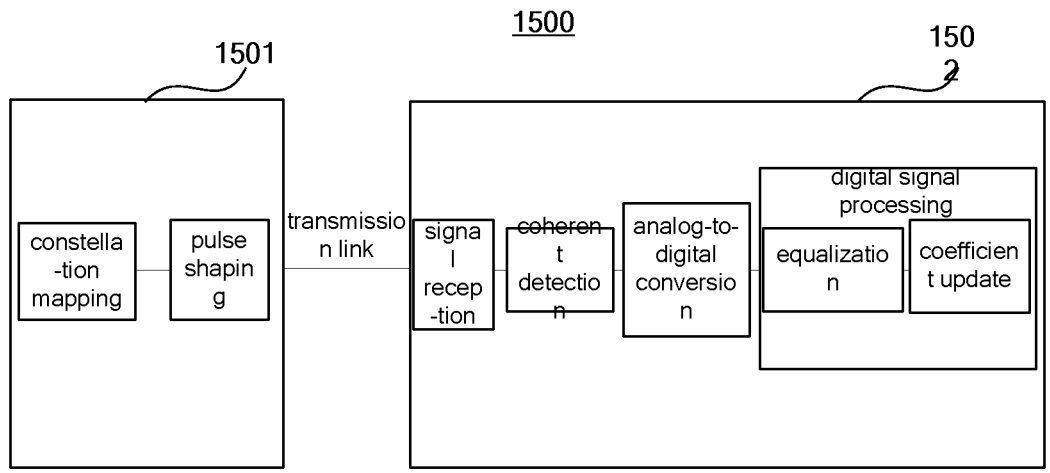
FIG. 15 is a schematic diagram of the structure of the optical communication system of an embodiment of the present invention.

FIG. 15 is a schematic diagram of the structure of the optical communication system of the embodiment of the present invention. As shown in FIG. 15, the optical communication system comprises a transmitter 1501 and the receiver 1502.

In this case, the transmitter 1501 modulates and transmits an optical signal, the optical signal comprising transmission data and a constant modulus signal for updating a coefficient of an equalization filter. The transmitter 1501 may perform constellation mapping and pulse shaping modulation, and transmit the transmission signal to the receiver 1502 via an optical fiber transmission link.

The receiver 1502 may comprise a signal receiver 1401, a coherent detector 1402, an analog-to-digital converter 1403, an equalization filer 1404 and a coefficient updater 1405. In this case, the functions of the equalization filer 1404 and the coefficient updater 1405 may be carried out via DSP processing.

It can be seen from the above embodiment that by adding constant modulus signals into transmission signals and updating equalizer coefficients only at the constant modulus signals in channel equalization, not only the coefficients of the equalizer may be optimized, but also being adapted to signals in various modulation formats, and the complexity of the channel equalization may be lowered as well.

Embodiment 4

An embodiment of the present invention further provides an updating method for an equalizer coefficient, applicable to the updating apparatus in Embodiment 1 or 2, and the same contents as those in Embodiment 1 or 2 shall not be described any further.

Figure 16:
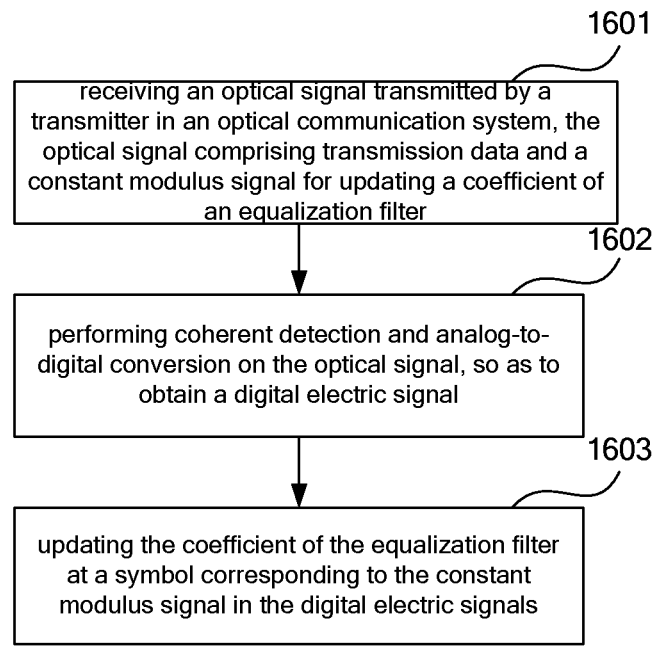
FIG. 16 is a flowchart of the updating method of an embodiment of the present invention.

FIG. 16 is a flowchart of the updating method of the embodiment of the present invention. As shown in FIG. 16, the updating method comprises:

step 1601: receiving an optical signal transmitted by a transmitter in an optical communication system, the optical signal comprising transmission data and a constant modulus signal for updating a coefficient of an equalization filter;

step 1602: performing coherent detection and analog-to-digital conversion on the optical signal, so as to obtain a digital electric signal; and step 1603: updating the coefficient of the equalization filter at a symbol corresponding to the constant modulus signal in the digital electric signal.

In this embodiment, such modulation formats as 16QAM, 32QAM or 8APSK, may be used for the transmission data, and such modulation formats as QPSK or 8PSK may be used for the constant modulus signals; however, the present invention is not limited thereto.

In an embodiment, the updating method may further comprise: determining whether symbols in digital electric signals correspond to symbols in constant modulus signals, according to symbol timing. And in step 1603, coefficients of the equalization filter are updated at the symbols that are determined as corresponding to the constant modulus signals.

Figure 17:
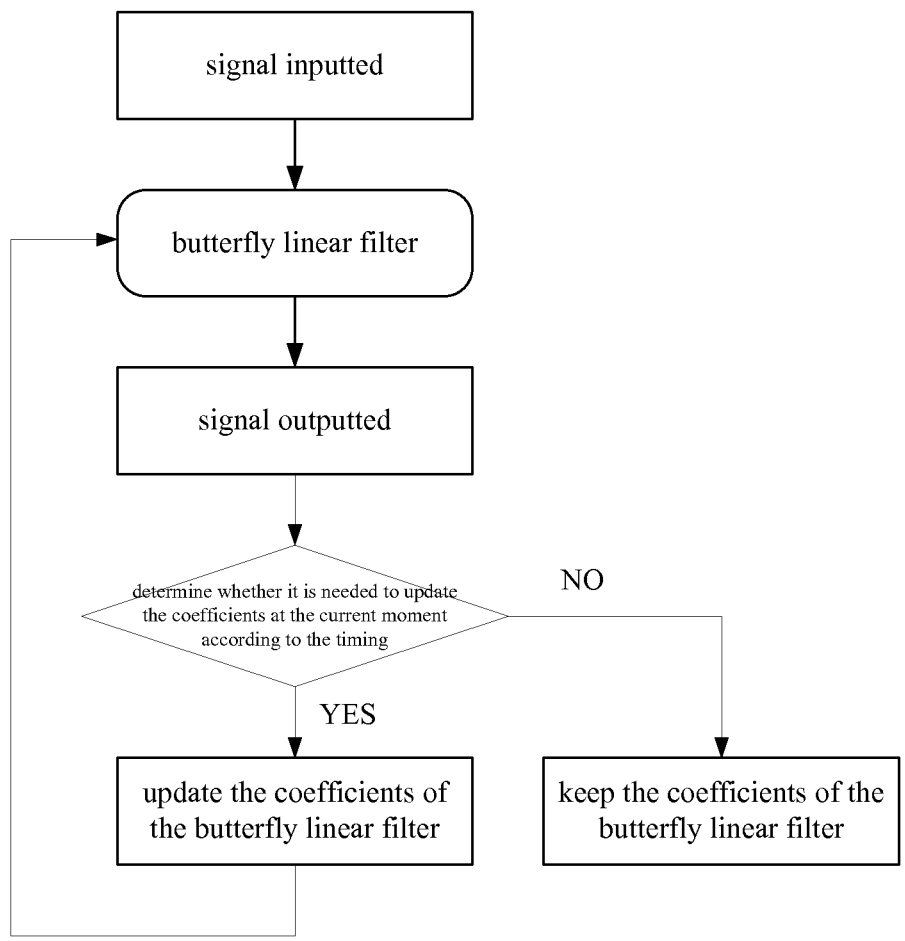
FIG. 17 is a schematic diagram of an example of the updating method of an embodiment of the present invention.

FIG. 17 is a schematic diagram of an example of the updating method of the embodiment of the present invention. As shown in FIG. 17, the processed digital signals are inputted into the butterfly linear filter for equalization, and whether the equalizer coefficients need to be updated is determined according to the timing.

In another embodiment, the updating method may further comprise: detecting the output signals of the equalization filter, so as to calculate an average value and/or variance of the moduli of the signals; and determining whether symbols in the digital electric signals are symbols corresponding to the constant modulus signals according to the average value and/or variance.

Figure 18:
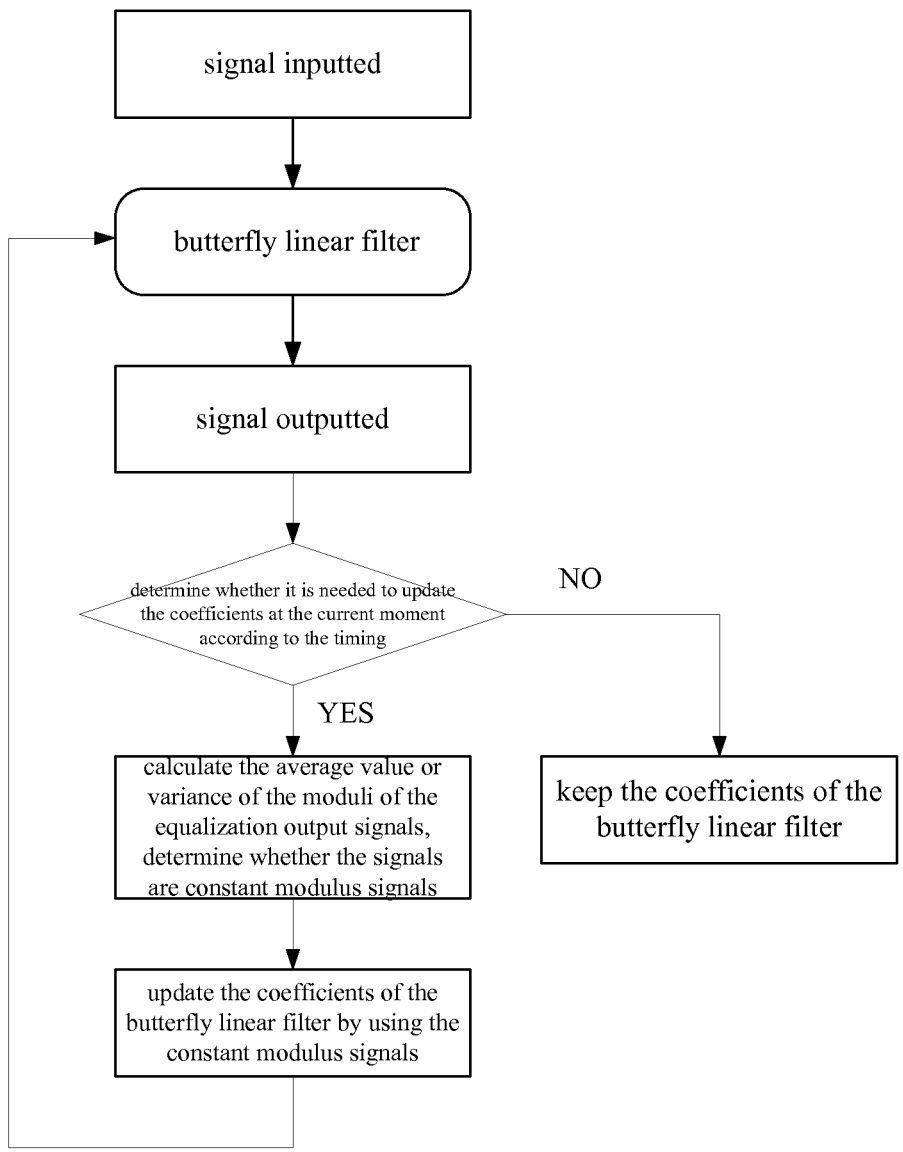
FIG. 18 is a schematic diagram of another example of the updating method of an embodiment of the present invention.

FIG. 18 is a schematic diagram of another example of the updating method of the embodiment of the present invention. As shown in FIG. 18, the signals are inputted into the butterfly linear filter for equalization, whether it is needed to update the equalizer coefficients is determined first according to the timing, and then whether the signals are constant modulus signals is determined according to the average value and/or variance of the moduli of the equalization output signals, thereby expanding the tolerance to timing errors.

In this case, FIG. 18 shows a case where symbol timing and average value/variance are combined. However, the present invention is not limited thereto, for example, determination may be performed by using an average value or variance only, and particular implementation may be determined as actually required.

In this embodiment, one or more predefined symbols of each frame in the equalization output signals may only be detected. And the updating method may further comprise: adjusting the equalization filter coefficients according to the average value and/or variance.

In particular, whether constant modulus signals exist in the dual polarization state signals outputted by the equalization filter may be determined; and if constant modulus signals exist in the dual polarization state signals, the equalization filter coefficients are respectively adjusted according to the distribution of the constant modulus signals at the two polarization states; and if constant modulus signals exist in one polarization state and do not exist in another polarization state, the equalization filter coefficients are simultaneously adjusted according to the distribution of the constant modulus signals at the polarization state where constant modulus signals exist.

Figure 19:
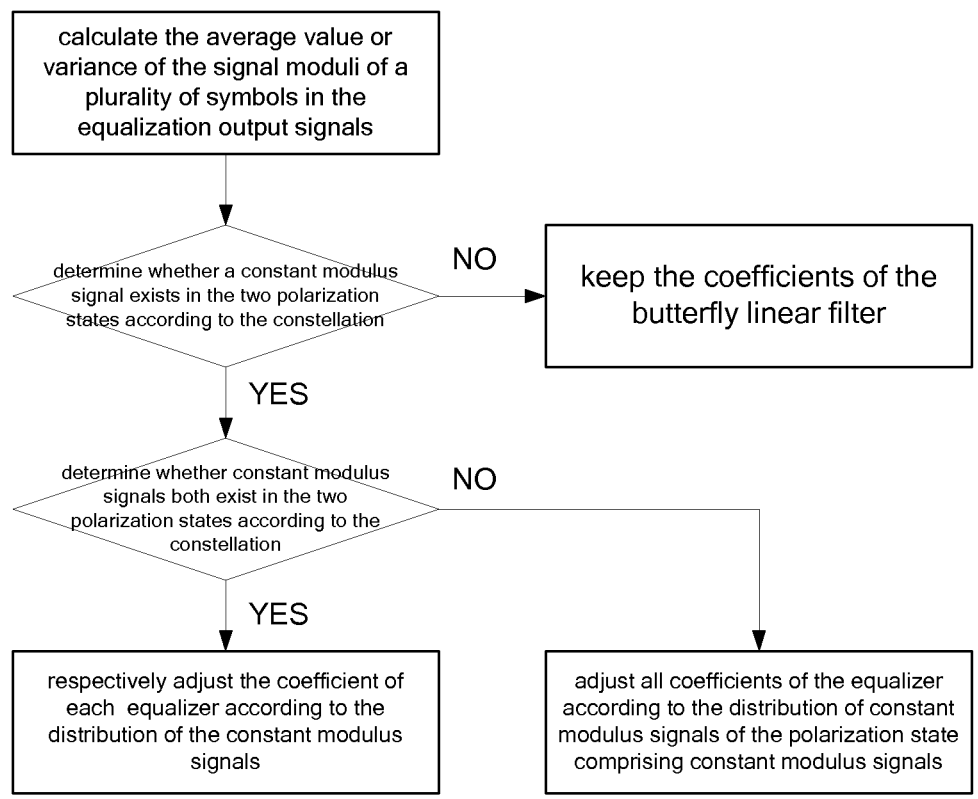
FIG. 19 is a schematic diagram of an example of a coefficient adjustment of an embodiment of the present invention.

FIG. 19 is a schematic diagram of an example of coefficient adjustment of the embodiment of the present invention. As shown in FIG. 19, an average value or variance of the signal moduli of current K equalization output symbols may be calculated, and the equalization filter coefficients are adjusted according to the average value or variance.

It can be seen from the above embodiment that by adding constant modulus signals into transmission signals and updating equalizer coefficients only at the constant modulus signals in channel equalization, not only the coefficients of the equalizer may be optimized, but also being adapted to signals in various modulation formats, and the complexity of the channel equalization may be lowered as well.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

For the implementation of the present invention containing the above embodiments, following supplements are further disclosed.

Supplement 1. An updating apparatus for an equalizer coefficient, comprising:

a signal receiver, configured to receive an optical signal transmitted by a transmitter in an optical communication system, the optical signal comprising transmission data and a constant modulus signal for updating a coefficient of an equalization filter;

a signal processor, configured to perform coherent detection and analog-to-digital conversion on the optical signal, so as to obtain a digital electric signal; and a coefficient updater, configured to update the coefficient of the equalization filter at a symbol corresponding to the constant modulus signal in the digital electric signal.

Supplement 2. The updating apparatus according to supplement 1, wherein the updating apparatus further comprises:

an information determiner, configured to determine whether the symbol in the digital electric signal is the symbol to which the constant modulus signal correspond according to symbol timing.

Supplement 3. The updating apparatus according to supplement 1, wherein the updating apparatus further comprises:

a numerical calculator, configured to detect an output signal of the equalization filter, so as to calculate an average value and/or variance of modulus of the signal; and an information determiner, configured to determine whether the symbol in the digital electric signal is the symbol to which the constant modulus signal correspond according to the average value and/or variance.

Supplement 4. The updating apparatus according to supplement 3, wherein the numerical calculator detects one or more predefined symbols of each frame in the output signal.

Supplement 5. The updating apparatus according to supplement 4, wherein the updating apparatus further comprises:

a coefficient adjuster, configured to adjust the coefficient of the equalization filter according to the average value and/or variance.

Supplement 6. The updating apparatus according to supplement 5, wherein the updating apparatus further comprises:

a signal determiner, configured to determine whether a constant modulus signal exists in dual polarization state signals outputted by the equalization filter;

and the coefficient adjuster respectively adjusts the coefficient of the equalization filter according to the distribution of the dual polarization state constant modulus signal when the constant modulus signal exists in the dual polarization state signals; and adjusts simultaneously the coefficient of the equalization filter according to the distribution of the constant modulus signal in the polarization state in which the constant modulus signal exists, when the constant modulus signal exists in one polarization state and does not exist in the other polarization state.

Supplement 7. The updating apparatus according to supplement 1, wherein a modulation manner of 16QAM, 32QAM, or 8APSK, is used for the transmission data; and a modulation manner of QPSK or 8PSK is used for the constant modulus signal.

Supplement 8. An updating method for an equalizer coefficient, comprising:

receiving an optical signal transmitted by a transmitter in an optical communication system, the optical signal comprising transmission data and a constant modulus signal for updating a coefficient of an equalization filter;

performing coherent detection and analog-to-digital conversion on the optical signal, so as to obtain a digital electric signal; and updating the coefficient of the equalization filter at a symbol corresponding to the constant modulus signal in the digital electric signal.

Supplement 9. The updating method according to supplement 8, wherein the updating method further comprises:

determining whether a symbol in the digital electric signal is the symbol corresponding to the constant modulus signal according to symbol timing.

Supplement 10. The updating method according to supplement 8, wherein the updating method further comprises:

detecting an output signal of the equalization filter, so as to calculate an average value and/or variance of the moduli of the signal; and determining whether a symbol in the digital electric signal is the symbol corresponding to the constant modulus signal according to the average value and/or variance.

Supplement 11. The updating method according to supplement 8, wherein one or more predefined symbols of each frame in the output signal are detected.

Supplement 12. The updating method according to supplement 11, wherein the updating method further comprises:

adjusting the coefficient of the equalization filter according to the average value and/or variance.

Supplement 13. The updating method according to supplement 12, wherein the updating method further comprises:

determining whether a constant modulus signal exists in the dual polarization state signals outputted by the equalization filter;

and if the constant modulus signal exists in the dual polarization state signals, the coefficients of the equalization filter are respectively adjusted according to the distribution of the constant modulus signal at the two polarization states; and if the constant modulus signal exists in one polarization state and does not exist in another polarization state, the coefficients of the equalization filter are simultaneously adjusted according to the distribution of the constant modulus signal at the polarization state where constant modulus signal exists.

Supplement 14. The updating method according to supplement 8, wherein a modulation manner of 16QAM, 32QAM, or 8APSK, is used for the transmission data; and a modulation manner of QPSK or 8PSK is used for the constant modulus signals.

Supplement 15. A receiver, comprising:

a signal receiver, configured to receive an optical signal transmitted by a transmitter in an optical communication system, the optical signal comprising transmission data and a constant modulus signal for updating a coefficient of an equalization filter;

a coherent detector, configured to perform coherent detection for the optical signal, so as to obtain an electric signal;

an analog-to-digital converter, configured to perform analog-to-digital conversion for the electric signal, so as to obtain a digital electric signal;

an equalization filer, configured to equalize the digital electric signal; and a coefficient updater, configured to update the coefficient of the equalization filter at a location in the digital electric signal corresponding to a symbol of the constant modulus signal.

Supplement 16. The receiver according to supplement 15, wherein the receiver further comprises:

an information determiner, configured to determine whether the symbol in the digital electric signal is the symbol to which the constant modulus signal correspond according to symbol timing.

Supplement 17. The receiver according to supplement 15, wherein the receiver further comprises:

a numerical calculator, configured to detect an output signal of the equalization filter, so as to calculate an average value and/or variance of moduli of the signal; and an information determiner, configured to determine whether the symbol in the digital electric signal is the symbol to which the constant modulus signal correspond according to the average value and/or variance.

Supplement 18. The receiver according to supplement 17, wherein the numerical calculator detects one or more predefined symbols of each frame in the output signal.

Supplement 19. The receiver according to supplement 18, wherein the receiver further comprises:

a coefficient adjuster, configured to adjust the coefficient of the equalization filter according to the average value and/or variance.

Supplement 20. The receiver according to supplement 19, wherein the receiver further comprises:

a signal determiner, configured to determine whether a constant modulus signal exists in dual polarization state signals outputted by the equalization filter;

and the coefficient adjuster respectively adjusts the coefficient of the equalization filter according to the distribution of the dual polarization state constant modulus signals when the constant modulus signal exists in the dual polarization state signals; and adjusts simultaneously the coefficient of the equalization filter according to the distribution of the constant modulus signal in the polarization state in which the constant modulus signal exists, when the constant modulus signal exists in one polarization state and does not exist in the other polarization state.

Supplement 21. An optical communication system, comprising the receiver as described in any one of supplements 15-20, wherein the optical communication system further comprises:

a transmitter, configured to modulate and transmit an optical signal, the optical signal comprising transmission data and a constant modulus signal for updating a coefficient of the equalization filter.

The invention claimed is:

1. An updating apparatus for an equalizer coefficient, comprising:

a signal receiver, configured to receive an optical signal transmitted by a transmitter in an optical communication system, the optical signal comprising transmission data and a constant modulus signal, wherein the constant modulus signal is added into the optical signal by a transmitter for updating a coefficient of an equalization filter;

a signal processor, configured to perform coherent detection and analog-to-digital conversion for the optical signal, so as to obtain a digital electric signal;

an information determiner, configured to determine whether a symbol in the digital electric signal is a symbol corresponding to the constant modulus signal; and a coefficient updater, configured to update the coefficient of the equalization filter at the symbol corresponding to the constant modulus signal in the digital electric signal.

2. The updating apparatus according to claim 1, wherein the updating apparatus further comprises:

a numerical calculator, configured to detect an output signal of the equalization filter, so as to calculate an average value and/or variance of moduli of the signal; and the information determiner is further configured to determine whether a symbol in the digital electric signal is the symbol corresponding to the constant modulus signal, according to the average value and/or variance.

3. The updating apparatus according to claim 2, wherein the numerical calculator detects one or more predefined symbols of each frame in the output signal.

4. The updating apparatus according to claim 3, wherein the updating apparatus further comprises:

a coefficient adjuster, configured to adjust the coefficient of the equalization filter according to the average value and/or variance.

5. The updating apparatus according to claim 4, wherein the updating apparatus further comprises:

a signal determiner, configured to determine whether a constant modulus signal exists in dual polarization state signals outputted by the equalization filter;

and the coefficient adjuster respectively adjusts the coefficient of the equalization filter according to the distribution of the dual polarization state constant modulus signal when the constant modulus signal exists in the dual polarization state signals; and adjusts simultaneously the coefficient of the equalization filter according to the distribution of the constant modulus signal in the polarization state in which the constant modulus signal exists, when the constant modulus signal exists in one polarization state and does not exist in the other polarization state.

6. An updating method for an equalizer coefficient, comprising:

receiving an optical signal transmitted by a transmitter in an optical communication system, the optical signal comprising transmission data and a constant modulus signal, wherein the constant modulus signal is added into the optical signal by a transmitter for updating a coefficient of an equalization filter;

performing coherent detection and analog-to-digital conversion on the optical signal, so as to obtain a digital electric signal;

determine whether a symbol in the digital electric signal is a symbol corresponding to the constant modulus signal; and updating the coefficient of the equalization filter at the symbol corresponding to the constant modulus signal in the digital electric signal.

7. The updating method according to claim 6, wherein a modulation manner of 16QAM, 32QAM, or 8APSK, is used for the transmission data; and a modulation manner of QPSK or 8PSK is used for the constant modulus signal.

8. A receiver, comprising:

a signal receiver, configured to receive an optical signal transmitted by a transmitter in an optical communication system, the optical signal comprising transmission data and a constant modulus signal, wherein the constant modulus signal is added into the optical signal by a transmitter for updating a coefficient of an equalization filter;

a coherent detector, configured to perform coherent detection on the optical signal, so as to obtain an electric signal;

an analog-to-digital converter, configured to perform analog-to-digital conversion on the electric signal, so as to obtain a digital electric signal;

an equalization filer, configured to equalize the digital electric signal;

an information determiner, configured to determine whether a symbol in the digital electric signal is a symbol corresponding to the constant modulus signal; and a coefficient updater, configured to update the coefficient of the equalization filter at the symbol corresponding to the constant modulus signal in the digital electric signal.

9. An optical communication system, comprising the receiver as claimed in claim 8, wherein the optical communication system further comprises:

a transmitter, configured to add a constant modulus signal for updating a coefficient of an equalization filter into an optical signal, to modulate and transmit the optical signal, the optical signal comprising transmission data and the constant modulus signal.

10. The updating apparatus according to claim 1, wherein the information determiner is further configured to determine whether the symbol in the digital electric signal is the symbol corresponding to the constant modulus signal, according to symbol timing.

* * * * *